United States Patent [19]

Kuwahara et al.

[11] Patent Number: 4,680,466
[45] Date of Patent: Jul. 14, 1987

[54] DISPLACEMENT TRANSDUCER WHICH SIMULTANEOUSLY EXTRACTS SIGNALS VIA SEQUENTIAL SWITCHING

[75] Inventors: Hajime Kuwahara; Yutaka Ono; Mitsuhiro Nikaido, all of Tokyo, Japan

[73] Assignee: Yokogawa Hokushin Electric Corporation, Tokyo, Japan

[21] Appl. No.: 725,088

[22] Filed: Apr. 19, 1985

[30] Foreign Application Priority Data

| Apr. 20, 1984 | [JP] | Japan | 59-79564 |
| May 10, 1984 | [JP] | Japan | 59-93650 |
| May 10, 1984 | [JP] | Japan | 59-93651 |
| May 10, 1984 | [JP] | Japan | 59-93652 |

[51] Int. Cl.$^4$ .............................................. G01D 5/34
[52] U.S. Cl. .......................... 250/231 SE; 250/237 G; 340/347 P
[58] Field of Search ................... 250/231 SE, 237 G; 340/347 P; 356/395

[56] References Cited

U.S. PATENT DOCUMENTS

| 4,384,204 | 5/1983 | Tamaki et al. | 250/231 SE |
| 4,445,110 | 4/1984 | Breslow | 250/231 SE |
| 4,465,928 | 8/1984 | Breslow | 250/231 SE |

Primary Examiner—David C. Nelms
Assistant Examiner—William L. Oen
Attorney, Agent, or Firm—Moonray Kojima

[57] ABSTRACT

A displacement transducer comprising a code disk on which a plurality of light permeable slits arranged with a fixed pitch are formed, a light source which emits light to the code disk, and an image sensor which receives the light from the light source through the light permeable slits. High resolution and fast response performance are realized by measuring a displacement of the code disk from the amount of the phase shift of a fundamental wave component contained in the output obtained from the image sensor. There is a further advantage of suppressing zero point return operation to a minimum as well as improving linearity of an image sensor.

11 Claims, 19 Drawing Figures

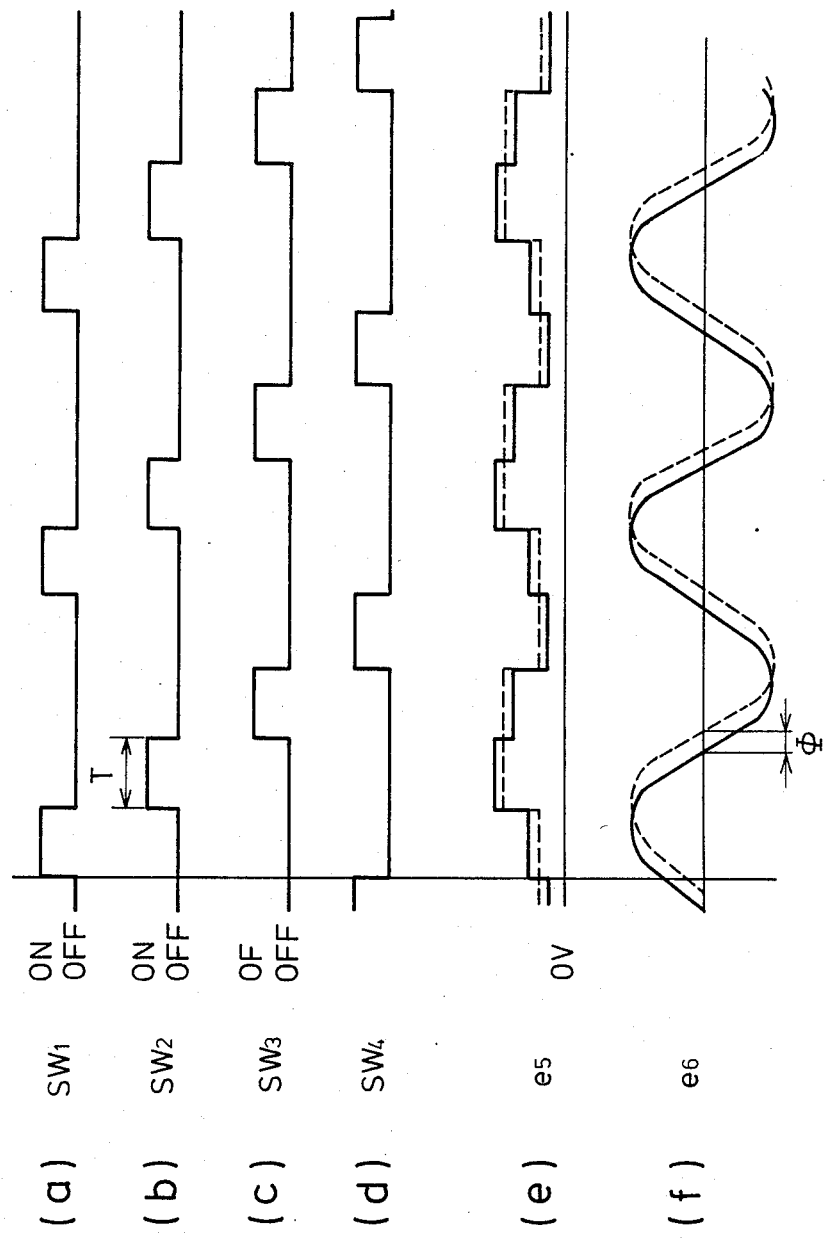

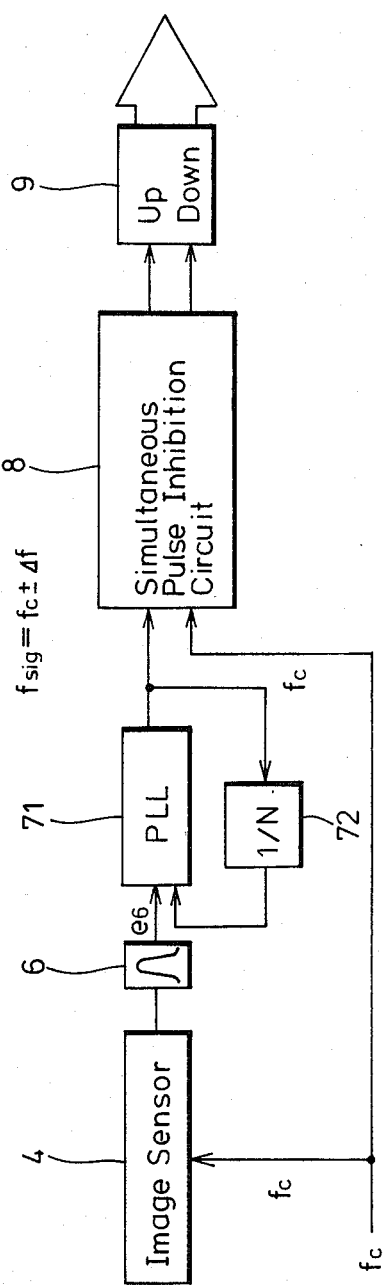

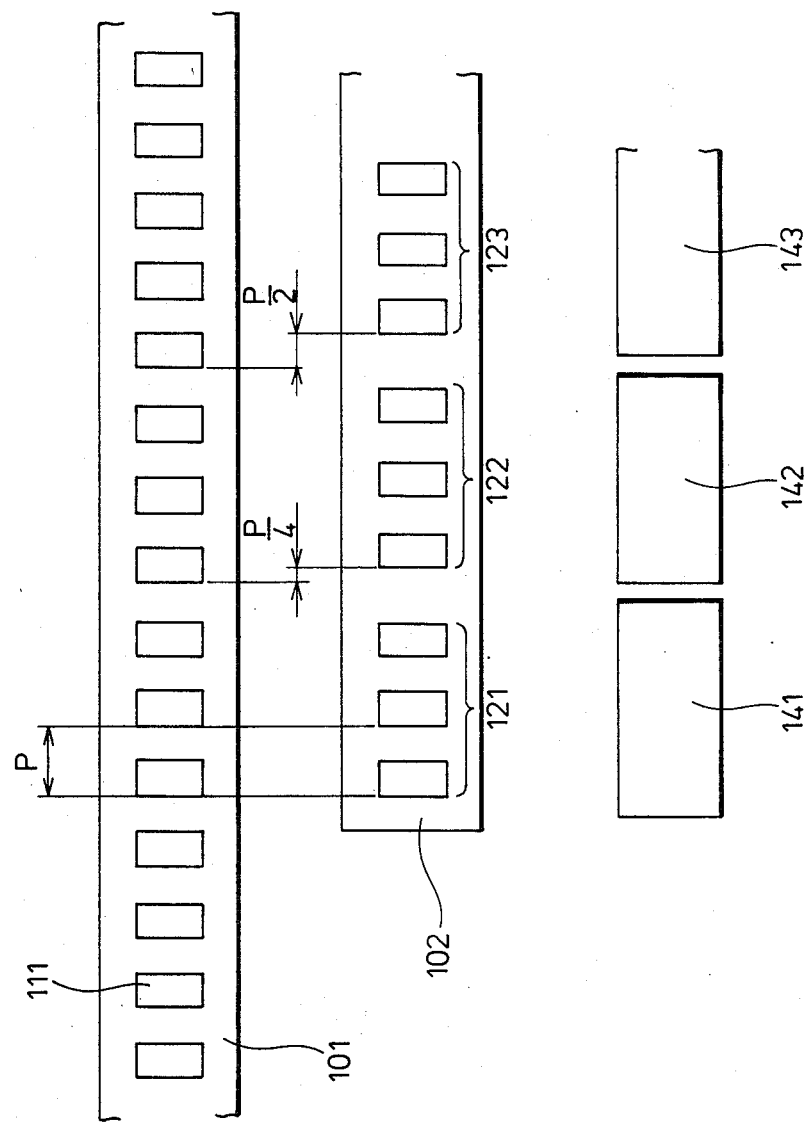

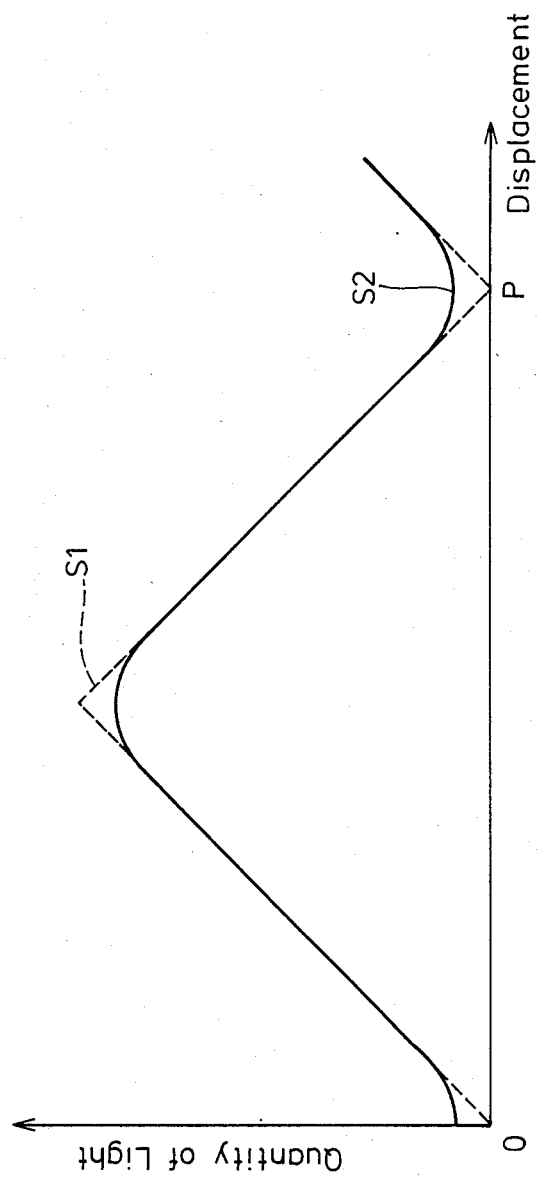

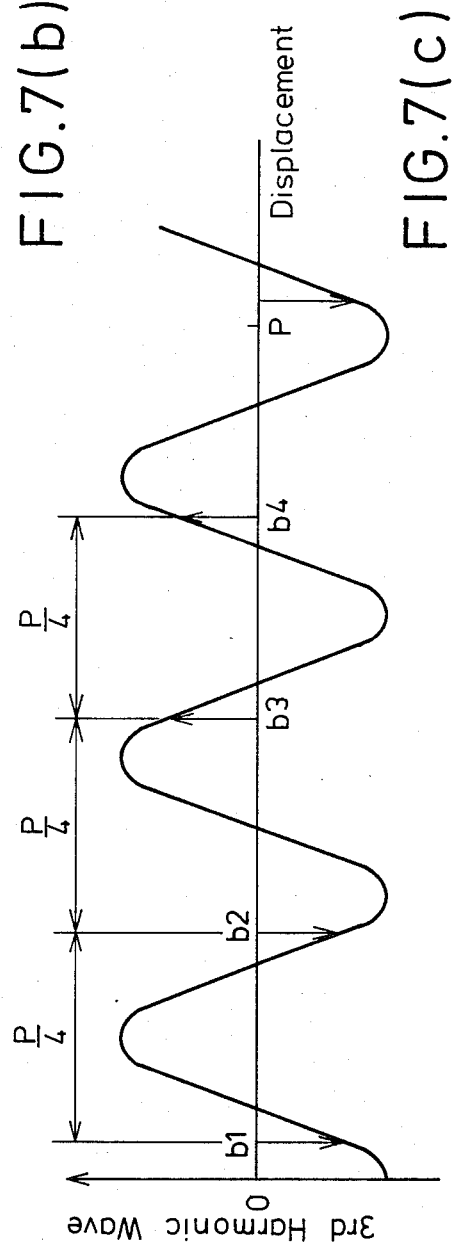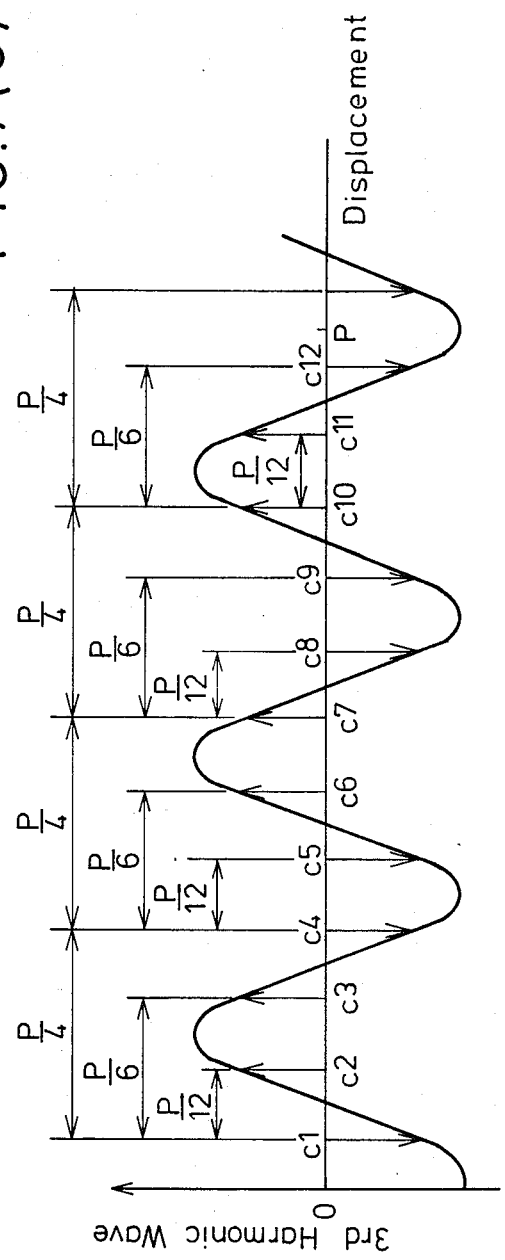

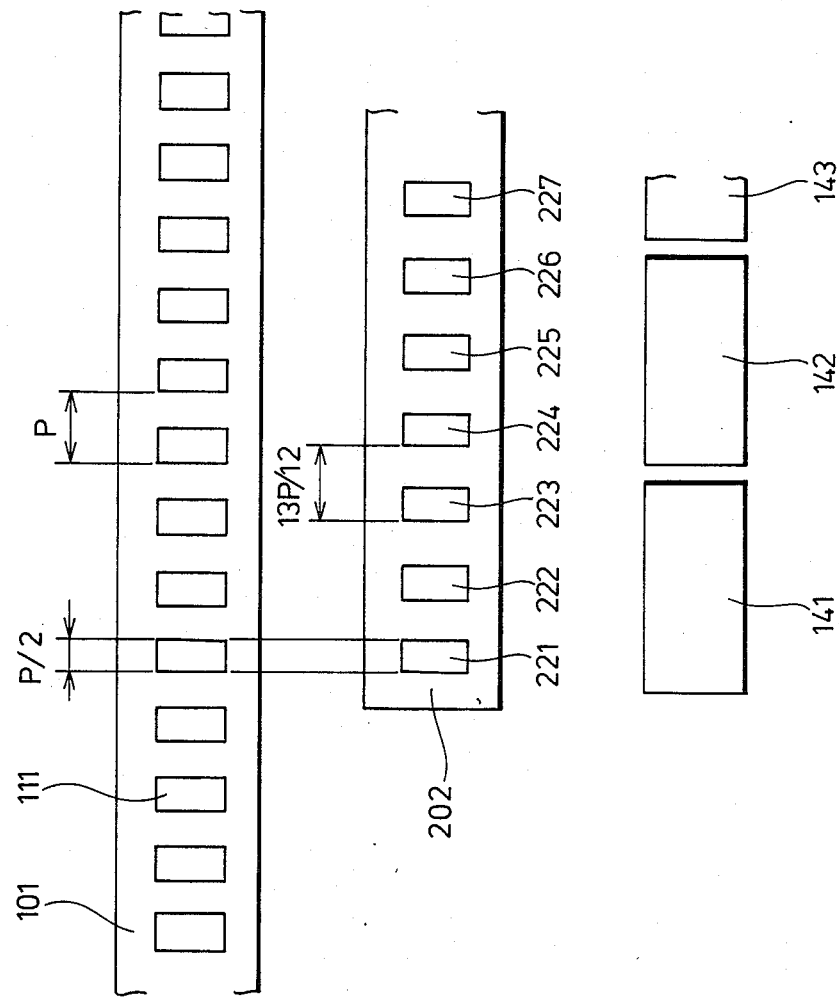

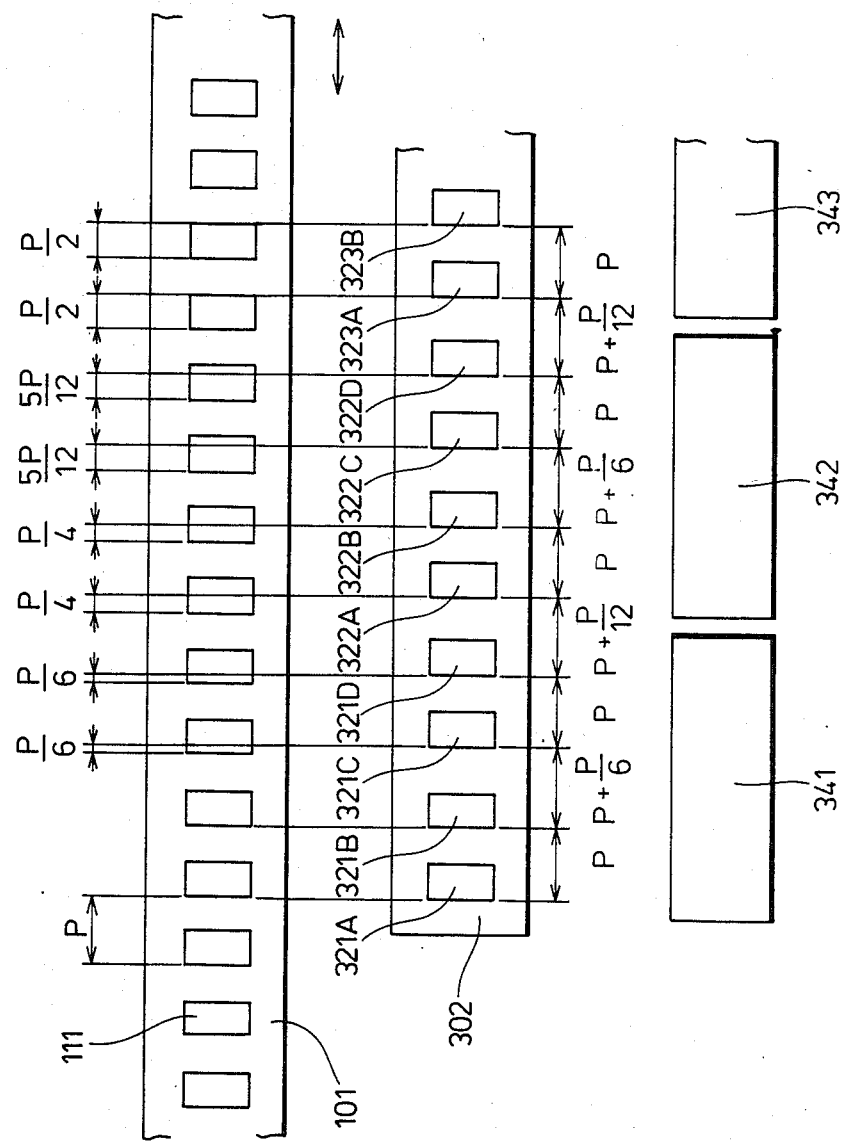

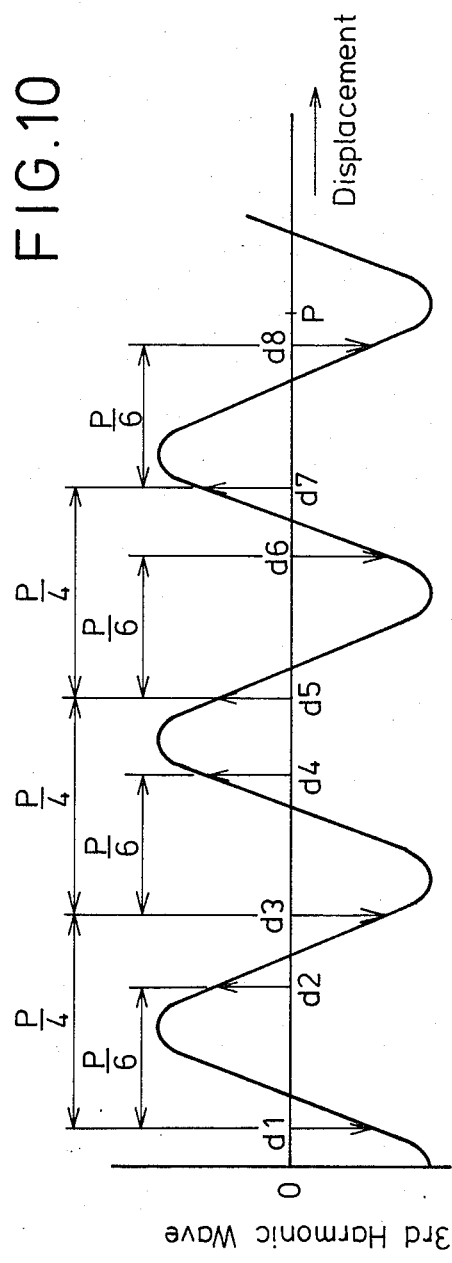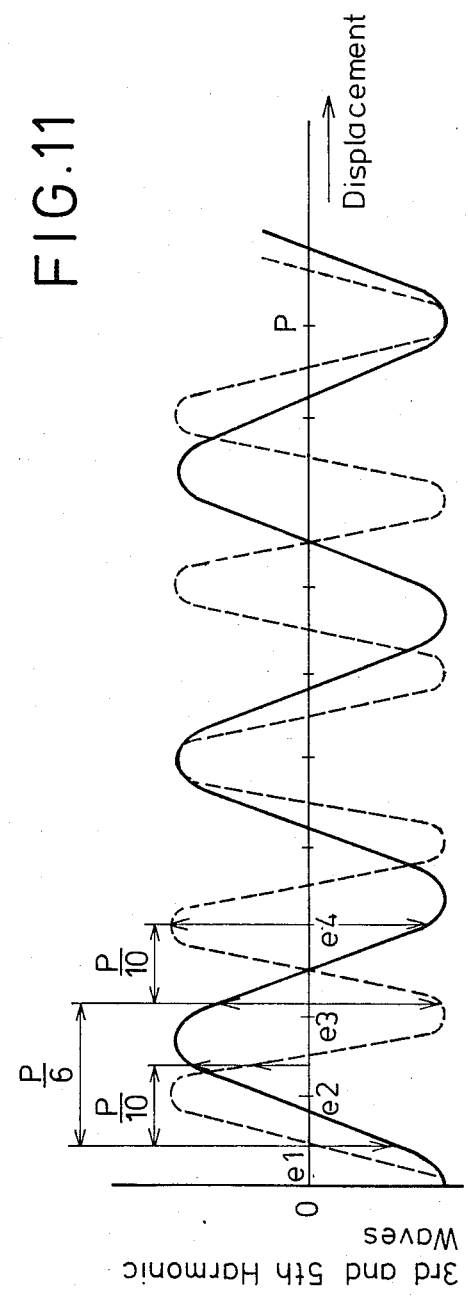

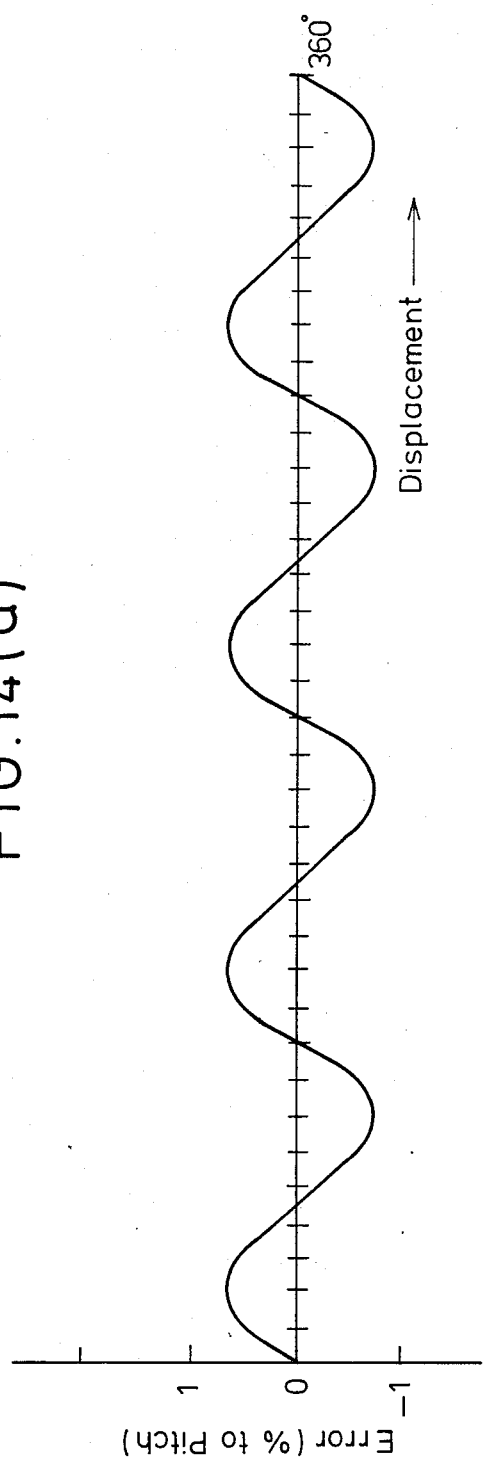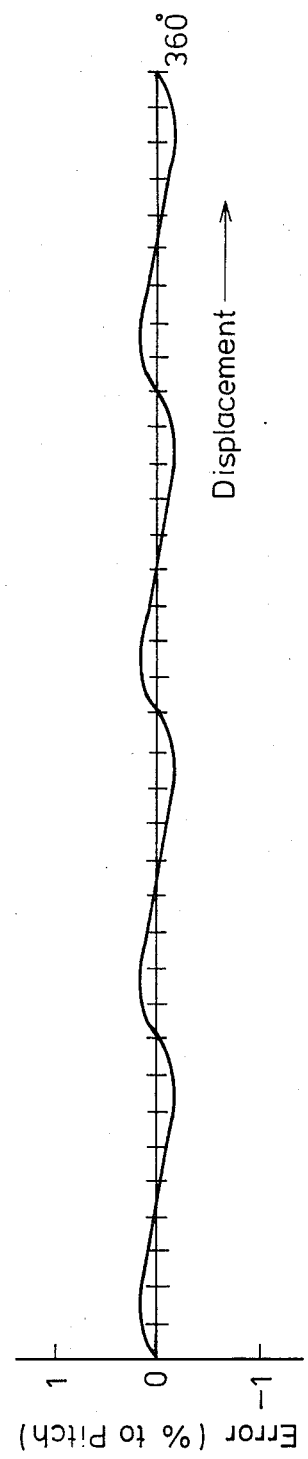
FIG.14(a)
FIG.14(b)

DISPLACEMENT TRANSDUCER WHICH SIMULTANEOUSLY EXTRACTS SIGNALS VIA SEQUENTIAL SWITCHING

BACKGROUND OF THE INVENTION

1. Field of Invention

This invention relates to a displacement transducer and, more particularly, to a displacement transducer which utilizes light to detect mechanical displacement.

2. Description of Prior Art

FIG. 1 depicts a conventional displacement transducer comprising a code disk 1, a code piece 2, light emitting element 3, and light receiving element 4. A plurality of light permeable units are evenly spaced around the circumference of code disk 1. The four light permeable unit groups $2_1$ through $2_4$ are formed on code piece 2 so that they are phase shifted respectively by 90° with respect to the light permeable unit of the code disk 1. Each of the light permeable groups $2_1$ through $2_4$ of code piece 2 consists of a plurality of light permeable units (three light permeable units in FIG. 1) formed with the same space as the light permeable unit of code disk 1. Light emitting element 3 comprises four elements disposed in order that each of the light permeable unit groups $2_1$ through $2_4$ is illuminated separately. Code disk 1 and code piece 2 are arranged so that they are relatively rotatable. Code piece 2, light emitting element 3 and light receiving element 4 are fixedly arranged so that code piece 2 and light emitting element 3 are opposite to light receiving element 4 through each of the light permeable unit groups $2_1$ through $2_4$ of code piece 2.

In order to detect an amount of rotation, four light emitting elements $3_1$ through $3_4$ are simultaneously turned ON and the output signals from the light receiving elements $4_1$ through $4_4$ are digitally parallel processed by means of logic circuits.

It is difficult, however, according to the conventional arrangement above described, to obtain a resolution power exceeding the space of the light permeable units formed on code disk 1 and code piece 2. Also, it is difficult to obtain a response faster than the response speed of light receiving element 4.

In a presently marketed encoder using phototransistors as the light receiving elements 4, for example, the upper limit of the response frequency is approximately 50 kHz. That is, when the encoder is combined with a DC motor which causes code disk 1 and code piece 2 (for producing 1000 pulses per revolution) to be rotated at a speed of 6000 rpm, the frequency will be 100 kHz which is insufficient for satisfactory detection. In addition, code disk 1 and code piece 2 (for producing 500 pulses or more per revolution) in a small sized encoder require highly accurate machining techniques and result in high cost.

Also, the conventional device causes problems such as uneven light intensity, uneven light receiving sensitivity, etc, since a plurality of light emitting elements and a plurality of light receiving elements are used.

SUMMARY OF THE INVENTION

Accordingly, an object of the invention is to overcome the aforementioned and other deficiencies and disadvantages of the prior art.

Another object is to provide a displacement transducer comprising a code disk on which a plurality of light permeable slits are formed with a fixed pitch, a light source which emits light to the code disk, and an image sensor which receives the light emitted from the light source through the light permeable slits, which transducer provides high resolution power and fast response performance by measuring displacement of the code disk from the amount of phase shift of the output reference wave component obtained from the image sensor.

A further object is to reduce non-linear errors in the displacement transducer.

A still further object is to minimize the zero point return operation in the displacement transducer.

BRIEF DESCRIPTION OF THE DRAWINGS

FIG. 4 is a graph depicting operational waveforms used in the operation of the device of FIG. 2.

FIG. 5 is a block diagram depicting an example of a phase shift measuring circuit.

FIG. 6 is an illustration depicting a first illustrative embodiment of the encoder of FIG. 2.

FIGS. 7(a) and 7(b) are graphs depicting waveforms used in operation of the device of FIG. 6.

FIG. 7(c) is a graph depicting waveforms used in the operation of the device of FIG. 8.

FIG. 8 is an illustration depicting a second illustrative embodiment of the encoder of FIG. 2.

FIG. 9 is an illustration depicting a third illustrative embodiment of the encoder of FIG. 2.

FIG. 10 is a graph depicting waveforms used in the operation of the device of FIG. 9.

FIG. 11 is a graph depicting waveforms used in the operation of a fourth illustrative embodiment of an encoder as slightly changed from that depicted in FIG. 9.

FIGS. 14(A) and 14(B) are graphs depicting characteristic curves of the device of FIGS. 3 and 12 respectively.

DETAILED DESCRIPTION OF PREFERRED EMBODIMENTS

Figure 1:
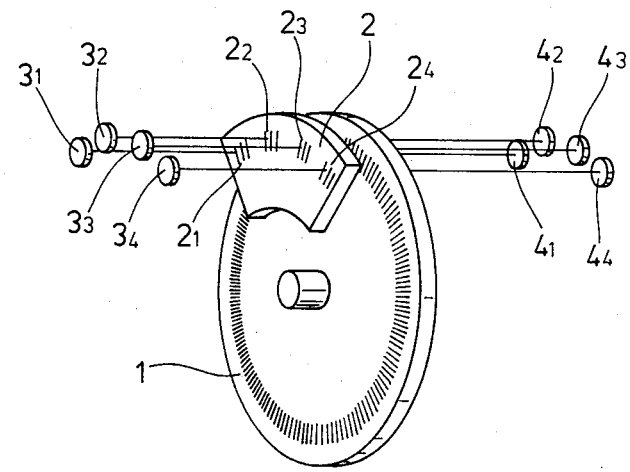
FIG. 1 is a pictorial view depicting a conventional transducer.
Figure 2:
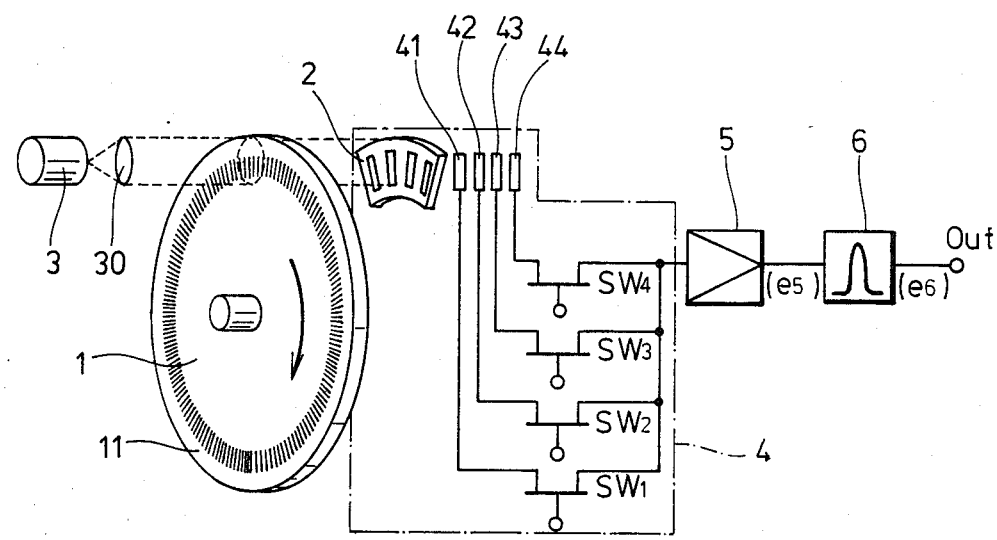
FIG. 2 is a pictorial view depicting an illustrative embodiment of the invention.

FIG. 2 depicts an illustrative displacement comprising a code disk 1, a plurality of light permeable slits 11 arranged with a fixed pitch around the circumference of code disk 1, a light source 3, a lens 30 which operates on the light beam from source 3 to produce a parallel beam, and an image sensor 4 which receives the light (slit image) from light source 3 through light permeable slit 11.

FIG. 2 shows a simplified image sensor which has 4 split photodiodes 41,42,43,44. Phase plate 2 is provided with slit holes arranged with a fixed pitch over the photodiodes. Switches $SW_1$–$SW_4$ remove, in turn with a constant timing, a signal from each of the 4 separated photodiodes 41-44. Amplifier 5 connected to switches $SW_1$-$SW_4$ amplifies a signal applied from image sensor 4 through each of switches $SW_1$-$SW_4$. A band pass filter 6 connected to amplifier 5 extracts a fundamental wave component of the output signal from amplifier 5.

Figure 3:
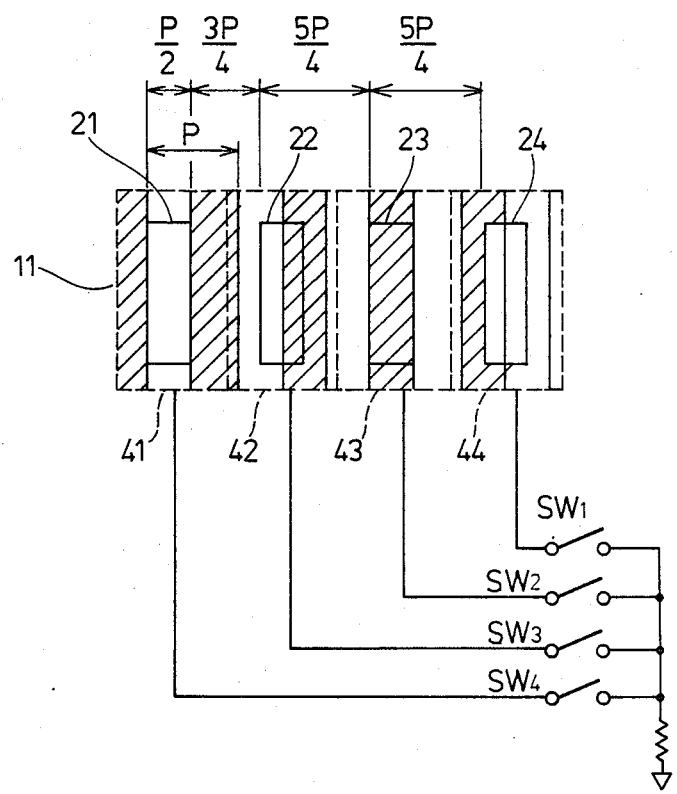
FIG. 3 is a partial illustration of the displacement transducer of FIG. 2.

FIG. 3 illustrates the relation between the arrangements of the light permeable slits 21,22,23,24 provided on phase plate 2 and the 4 separated photodiodes 41-44. The pitch of the arrangement of the light permeable slits 21-24 (shown by solid lines) is equal to the pitch of the arrangement of the 4 split photodiodes 41-44 (shown by the dotted lines). It is noted that the above pitch is formed so that it becomes 5/4 P to the pitch P of the arrangement of the light permeable slits (shown by the oblique lines) provided on code disk 1. Also note that the slit width of each of slit holes 21 through 24 is P/2 in this case.

Operation of the above devices of FIGS. 2,3 will now be described with reference to FIG. 4. Light from light source 3 is formed by lens 30 into a parallel beam which passes through light permeable slit 11 of code disk 1 and light permeable slits 21-24 of phase plate 2 and then causes the image of light permeable slit 11 to be focused on 4 separated photodiodes 41-44. Each of switches $SW_1$-$SW_4$ is turned ON and OFF (ON time is represented by T) in order with a timing schedule as shown in FIG. 4, line (a)-line (d), and takes out in order a signal from each of photodiodes 41-44.

Amplifier 5 amplifies this signal. Consequently, the output signal $e_5$ of amplifier 5 presents, as shown in FIG. 4, line (e), a stepped wave form which changes its amplitude step by step every time each of switches $SW_1$-$SW_4$ is turned ON. When the stepped wave form $e_5$, as described above, is applied to band pass filter 6, sine wave signal $e_6$ as shown in FIG. 4, line (f) is obtained.

The fundamental wave frequency of this sine wave signal $e_6$ coincides with the repetition frequency which causes switches $SW_1$-$SW_4$ to be driven successively. When code disk 1 rotates in accordance with the replacement to be measured, the image focused on each of the photodiodes 41 through 44 is displaced and the phase of sine wave signal $e_6$ obtained from band-pass filter 6 is shifted by an angle of $\phi$, for example, as shown by the dotted line, in response to an amount of displacement of the image, that is the displacement of the code disk. If code disk 1 is rotated by one pitch P of the arrange pitch of the light permeable slit 11, the amount of the phase shift of the sine wave $e_6$ becomes 2 pi.

Thus, it is possible to obtain a revolution angle within the arrange pitch P of the light permeable slit 11 formed on code disk 1, by measuring the amount of the shift of this phase.

FIG. 5 shows in block diagram, an example of the phase shift measuring circuit. This circuit operates to cause the phase of the since wave signal $e_6$ obtained from band pass filter 6, to be interposed by 100 through 1000 or so. That is, the sine wave signal $e_6$ is applied to phase locked loop (PLL) 71 having the 1/N (N represents a frequency dividing ratio) frequency divider 72 as a feedback circuit, and signal $f_{sig}$ having a frequency N-multiplied by the PLL and the reference clock signal (this reference clock is used as a drive signal for image sensor 4) fc are made to pass through the simultaneous pulse inhibition circuit 8, then these two signals are given to the up down counter 9. When code disk 1 makes a revolution in the direction (fc+f) in which the frequency of the signal $f_{sig}$ N-multiplied by the PLL 71 becomes higher than the fc, the up down counter 9 makes an up count. On the other hand, when the code disk 1 rotates in the direction (fc−f) in which the frequency of the $f_{sig}$ becomes lower than fc, the up down counter makes a down count. Therefore, from the output of the up down counter 9, it is possible to interpose an amount of phase shift, that is, a revolution angle of code disk 1 with a high resolution which is 1/1000 of 1P, if the frequency dividing ratio N is assumed to be 1000, for example.

According to the displacement transducer having the above arrangement, high resolution power and fast response performance is realized using a comparatively simple arrangement.

In addition, a displacement transducer according to the invention has the advantage that it is free from adverse influence caused by intensity change of the light source, sensitivity changes of the elements comprising the image sensor, etc.

FIG. 6 illustrates a first illustrative embodiment of the optical system of the above arrangement. For easy understanding, FIG. 6 represents a straight line type encoder. Code disk 101 is provided with slits 111 with a constant pitch P. Phase plate 102 is provided with slit groups 121,122, 123, (partially shown) and 124 (not shown), each of which consists of three slits arranged with pitch P. These slit groups correspond respectively to photodiodes 141,142,143 (partially shown) and 144 (not shown), and a pitch of the slits is increased by P/4 at each boundary between the adjacent slit groups. The slit width of each slit slot is P/2 which is the same as FIG. 3.

FIG. 7(a) depicts wave forms of each differently phased signal which is output, corresponding to a displacement of code disk 101 (of FIG. 6) respectively from the above photodiodes 141-144 (time chart will also show the same wave form if the displacement velocity is constant). Since the quantity of light entering the photodiode is directly proportional to the aperature areas of code disk 101 and phase plate 102, a repetitive wave form of the same chopping wave appears as a displacement code disk 101 is increased by a pitch P. A theoretical chopping wave form is the wave form S1 (shown by a dotted line) but it is practically like the wave form S2 (shown by a solid line) due to leakage of light and other reasons. Since this wave form S2 contains 3rd, 5th, 7th, 9th, 11th . . . , harmonic waves, in addition to a fundamental wave form (ideally, only this waveform is desirable), the amount of shift of the sine wave signal $e_6$ in FIG. 4 is not directly proportional to the displacement but it assumes a value influenced by the above harmonic wave components. Consequently, a non-linear error is produced in the output in the case of the above displacement transducer.

FIG. 7(b) shows a waveform of the 3rd harmonic wave having the largest influence. This chart shows a wave form of the 3rd harmonic wave component of the photodiode output corresponding to the quantity of light, passing through each one of the slits 111 and the slits of the phase plate 102, to a displacement of the code disk 101 (see FIG. 6). The times b1, b2,b3, and b4 are the phase positions occupied respectively by slit groups 121,122,123, 124 of phase plate 102 when code disk 101 is at a specific position. Since each three slits belonging to each of slit groups 121,122, 123,124 have the same phase, the 3rd harmonic wave whose amplitude is three times as large as the wave form in FIG. 7(b) is output from each of photodiodes 141–144. It is desirable to possibly reduce the above harmonic waves which cause a non-linear error to occur.

FIG. 8 depicts a second illustrative embodiment of a displacement transducer and comprises a device whose slit arrangement of phase plate 2 for use in the displacement transducer of FIG. 2, differs from that of FIG. 6. Similarly to the case of FIG. 6, the illustration is made with a straight type encoder, and the same codes are given and the explanations are omitted as to the same parts as of FIG. 6.

In phase plate 202, which differs from that of FIG. 6, slit holes 221 through 232 (partially shown) are arranged with a pitch of 13 P/12. This pitch is acceptable if it is shifted by P/12 from P. Therefore, a pitch of 11P/12 will do. Slit holes 221 through 223, 224 through 226, 227 through 229 (partially illustrated) and 230 through 232 (not illustrated) are at positions which are opposite to photodiodes 141,142,143 (partially shown) and 144 (not shown), respectively. The slit width of each slit hole is P/2 which is the same as that of FIG. 6.

FIG. 7(c) depicts waveforms of the 3rd harmonic wave component of the photodiode output corresponding to the quantity of light, passing through each one of the slit and the phase plate 202, to a displacement of code disk 101. The times C1 through C12 are the phase positions occupied respectively by slit slots 221 through 232 of phase plate 202 when code disk 101 is at a specific position. That is, the outputs corresponding to slit holes 221 through 223, 224 through 226, 227 through 229, and 230 through 232 are in the out of phase relation. The outputs in phases C1 and C2, C5 and C6, C7 and C8, and C11 and C12 in FIG. 7(c) are cancelled out with each other. Thus, the amplitude of the 3rd harmonic wave contained in the outputs of photodiodes 141 through 144 becomes ⅓ of that in the case of FIG. 7(b). Consequently, for the sine wave signal $e_6$ in FIG. 4, a harmonic wave component having influence on the amount of the phase shift $\phi$ is reduced and a non-linear error is greatly decreased.

Similarly, if the number of slit holes of the phase plate is made to be 5×4=20 and the slits are arranged with a pitch shifted by P/20 from the code disk slit pitch P, it will also be possible to decrease the 5th harmonic to 1/5.

Generally, assuming that the number of the split light receiving elements is n and the number of the phase plate slit holes corresponding to each light receiving element is m, it is possible to reduce the mth harmonic wave to 1/m provided that the phase plate slit holes are arranged with a pitch shifted (in the positive or negative direction) by P/(m·n) with respect to the pitch of the code disk slits.

FIG. 9 shows a third illustrative embodiment of the displacement transducer of the invention. A major part of the device whose slit arrangement of the phase plate 2 for use in the transducer of FIG. 2 is changed in the same way as the second illustrative embodiment. Similar to FIG. 6, the illustrative embodiment is of a straight line type encoder, and the same codes are given and for sake of simplicity of description, the same parts as of FIG. 6 are omitted from explanation hereat. Shown are 4 separated photodiodes 341,342,343 (partially shown) and 344 (not shown); a phase plate 302; and slit holes 321A–321D, 322A–322D, 323A–323D (partially shown) and 324A–324D (not shown), which are provided on phase plate 302 corresponding (facing) respectively to photodiodes 341,342, 343, 344, (four slits holes are made to be opposite of one photodiode in this case).

In slit slots 321A–321D of phase plate 302 which are opposite to photodiodes 341, the space between slit holes 321A and 321B and the space between slit holes 321C and 321D are P, while the space between slit holes 321B and 321C is P+P/6−7P/6. Similar slit slot arrangement is also applied to the slit holes acorresponding to photodiodes 342,343 and 344, and the spaces between slit holes 321D and 322A, 322D and 323D, and 323D and 324A are all 13P/12. The slit width of each slit holes is P/2 which is the same as that in FIG. 6.

The pitch in each slit group may be acceptable if it is shifted by P/6 from the P, that is, a space 5P/6 will do for the space between slit holes 321B and 321C.

FIG. 10 depicts a wave form of a 3rd space harmonic component of the photodiode output corresponding to the quantity of light, passing through each one of slit 111 and the slit holes of phase plate 302, to a displacement of the above code disk 101 (see FIG. 9), d1, d2,d3,d4,d5,d6,d7 and d8 are the phase positions occupied respectively by slit holes 321A and 321B, 321C and 321D, 322A and 322B, 322C and 322D, 324A and 324B, and 324C and 324D of phase plate 302 when code disk 101 is at a specific position. That is, in the slit group corresponding to photodiode 341, slit holes 321A and 321B (phase d1) and slit holes 321B and 321D are phase shifted by P/6 equivalent to a 180° phase difference for the 3rd harmonic wave which is caused to be cancelled out in this case. Consequently, the 3rd harmonic wave is not detected from the output of photodiode 341. The above behavior also occurs as to the outputs from photodiodes 342, 343, 344.

According to the above arrangement, for the amount of shift $\phi$ of the sine wave signal $e_6$ in FIG. 4, linearity is greatly improved because the 3rd harmonic wave component having the most important influence on non-linear erro is eliminated.

In the third illustrative embodiment, a phase shift P/6 is provided between slit holes 321A and 321B and between 321C and 321D. However, it is also acceptable to provide a phase shift P/6 between slit holes 321A and 321B and between slit slots 321C and 321D and to provide no phase shift (in phase) between slit holes 321A and 321C and between slit slots 321B and 321D. That is, it is acceptable if a phase shift of P/6 is provided between half of the slit group corresponding to one photodiode and the remaining half of the slit group.

Similar to the above arrangement wherein the 3rd space harmonic wave is eliminated by shifting the phase of the slit hole by P/6, it is also possible to eliminate the 5th space harmonic wave if the phase is shifted by P/10. In general, it is possible to eliminate the (2n+1)th space harmonic wave by providing a phase shift of P/(4n+2).

A fourth illustrative embodiment of a displacement transducer of the invention is obtained by eliminating the 3rd and 5th space harmonic waves by providing a phase shift P/6 between the slit holes 321A and 321C of phase plate 302 in FIG. 9 and providing a phase shift of P/10 between slit slots 321B and 321A and between slit holes 321D and 321C. The fourth illustrative embodiment will be referred to as the FIG. 9 embodiment having the above changes.

FIG. 11 shows the waveforms for operating the fourth illustrative embodiment, namely, the 3rd harmonic (shown by solid line) and the 5th harmonic (shown by the dotted line) of the output of the photodiode corresponding to the quantity of light, passing through each one of the slits 111 and slit holes of phase plate 302, to a displacement of code disk 101. The times e1,e2,e3,and e4 are phase positions occupied respectively by slits 321A, 321B, 321C, and 321D, corrresponding to photodiode 341 of phase plate 302 when code disk 101 is at a specific position. That is, the 3rd space harmonic is cancelled out in phases e1 and e3 and phases e2 and e4, while the 5th space harmonic is cancelled out by the combinations of the phases e1 and e2 and phases e3 and e4. Consequently, the 3rd and 5th space harmonic waves are not contained in the output from photodiode 341. The same operation takes place as to photodiodes 342-344.

While there has been described an embodiment which uses four slit holes on the phase plate corresponding to each photodiode to eliminate the 3rd and 5th space harmonic waves, it is possible to eliminate the 3rd, 5th and 7th space harmonic waves, if eight slit holes similar to the above, are used. That is, it is generally possible to eliminate the 3rd, 5th, 7th, ... and (2n=1)th space harmonic waves contained in the output signal from the above photodiode, by arranging $2^n$ (n is any positive integer) slit holes so that couples of slit holes, each coupled slit holes of which are phase shifted mutually by P/6, P/10, P/14 ... and P/(4n+2), are formed to as many as 1,2,4, ... $2^{n-1}$.

Figure 12:
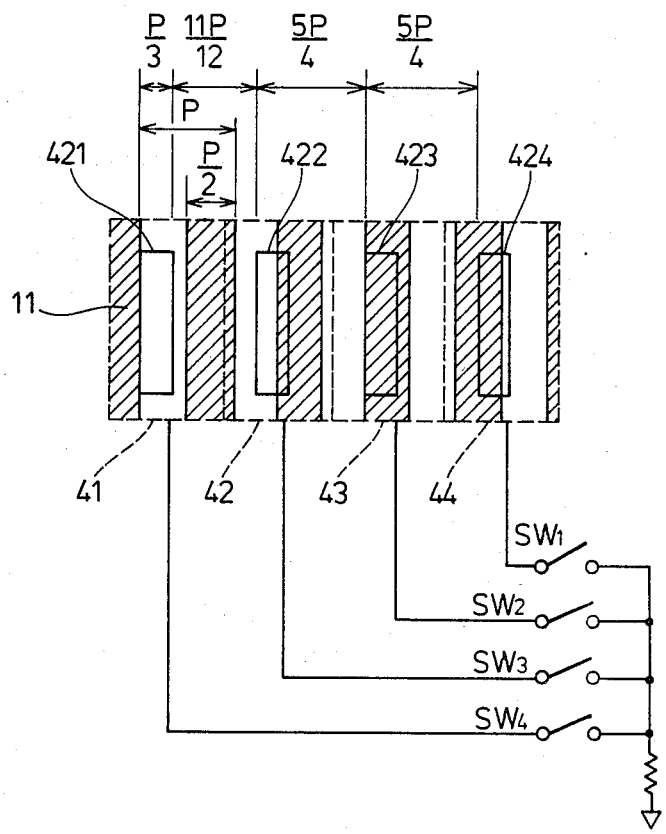
FIG. 12 is an illustration depicting a fifth illustrative embodiment of the encoder of FIG. 2.

FIG. 12 shows a fifth illustrative embodiment of a displacement transducer according to the invention and comprises a phase plate whose slit width differs from that of the phase plate 2 for use in the transducer of FIG. 2. The part different from FIG. 3 is that the slit slots are formed so that the slit width of slit holes 421,422,423 and 424 (shown by solid lines) of phase plate 2 is P/3 to the arrange pitch P of the light permeable slits (shown by oblique lines) provided on code disk 1.

Figure 13:
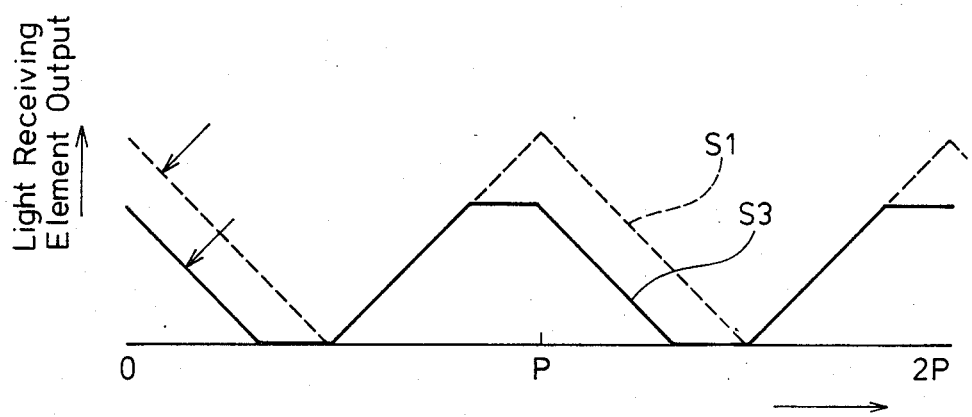
FIG. 13 is a diagram depicting waveforms used in the operation of the device of FIG. 12.

The operational wave form chart of FIG. 13 shows the signal wave form S3 (shown by solid line) which is differently phased and output from each of the photodiodes 41-44, for displacement of the above code disk 1, when the phase plate, as described above, is used (the time chart will show the same wave form if a displacement velocity is constant). The dotted line shows, for a comparison, the signal wave form S1 when the width of the phase slit slot is P/2 (see FIG. 3). Since the width P/3 of the phase plate slit holes is smaller than the width P/2 of the light permeable slit of code disk 1, there is produced a range in which the light receiving element output remains unchanged to a displacement of code disk 1. Consequently, a repetitive wave form of the same trapezoidal wave form which appears as a displacement of code disk 1 is increased by pitch P. Since this wave form S3 contains little of the 3rd space harmonic wave, as contained in wave form S1, the linearity is improved 7 times, or so, when compared to the case of FIG. 3. (See the graphs of FIGS. 14(a) and 14(b)).

While the width of the phase plate slit holes is P/3 in the above embodiment, similar effect may be obtained if the width of the light permeable slit of the code disk is P/3.

In case characteristic deterioration is negligible to some extent, a slit width, with the exception of a slit width P/3, which is smaller than P/2 may be adopted.

Figure 15:
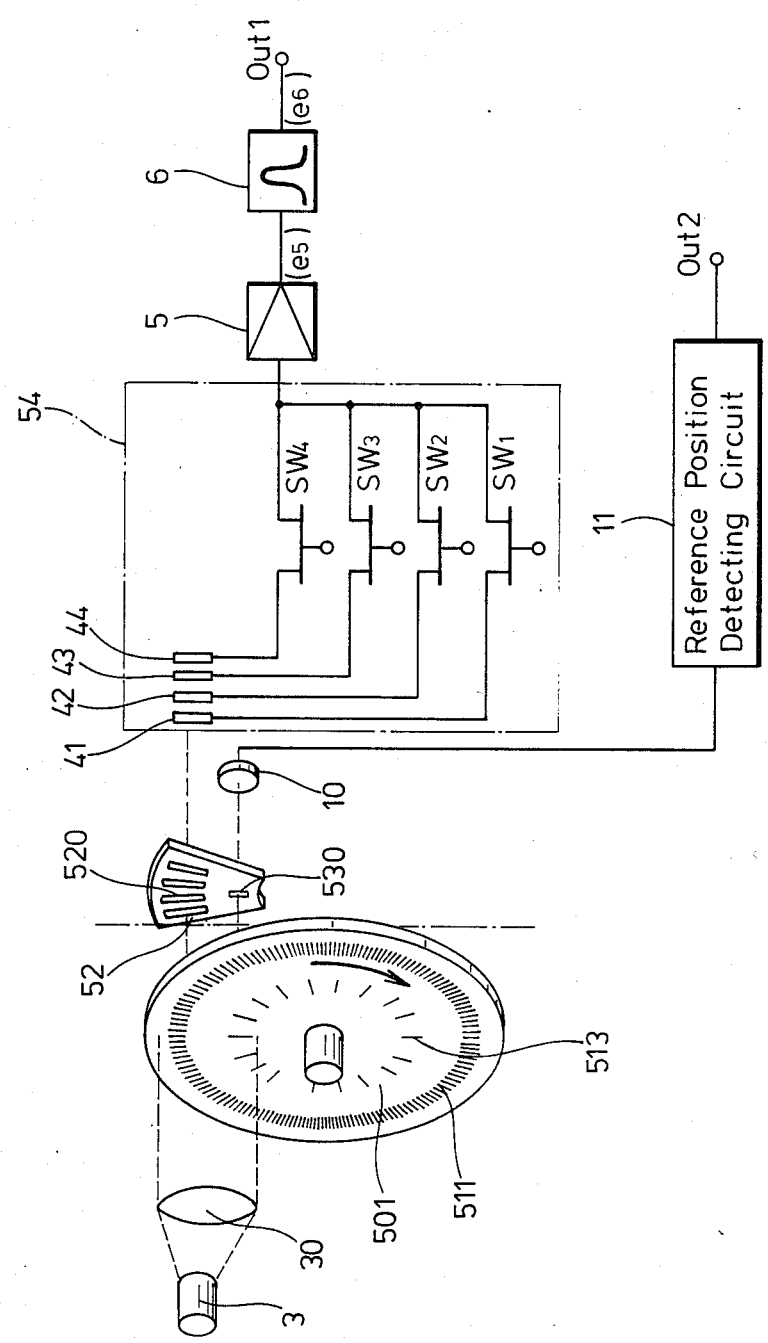
FIG. 15 is a pictorial view depicting a sixth illustrative embodiment of the displacement transducer of the invention.

FIG. 15 shows a 6th illustrative embodiment, which is similar to FIG. 2, but additionally provided with a zero position returning feature required at the time power is turned ON when an incremental type encoder as described above is used with a robot having a method for directly driving articulates. Note that the same codes are given and illustrations are omitted for the same parts as in FIG. 2. There is depicted a phase plate 52, a light permeable 520, a plurality of which are arranged in a circumference with a regular pitch on the phase plate, a slit 530 indicating a reference position, a code disk 501 which is displaced relatively with respect to the phase plate 52, an angle detecting slit 511 (corresponding to 11 in FIG. 2) a plurality of which are arranged with a regular pitch on code disk 501, a plurality of reference position detecting slits 513, each of which is arranged in the above displacement direction accompanying a different phase shift with respect to angle detecting slit 511, a second light receiving element 10, such as a photodiode, and the like which receives light passing through reference position detecting slit 513 of code disk 501 and through slit 530 indicating a reference position of phase plate 52, a sensor unit 54 comprising photodiodes 41-44 and switches $SW_1$-$SW_4$, and reference position detecting circuit 11 which outputs a signal indicating a reference position according to the signal from photodiode 10.

Figure 16:
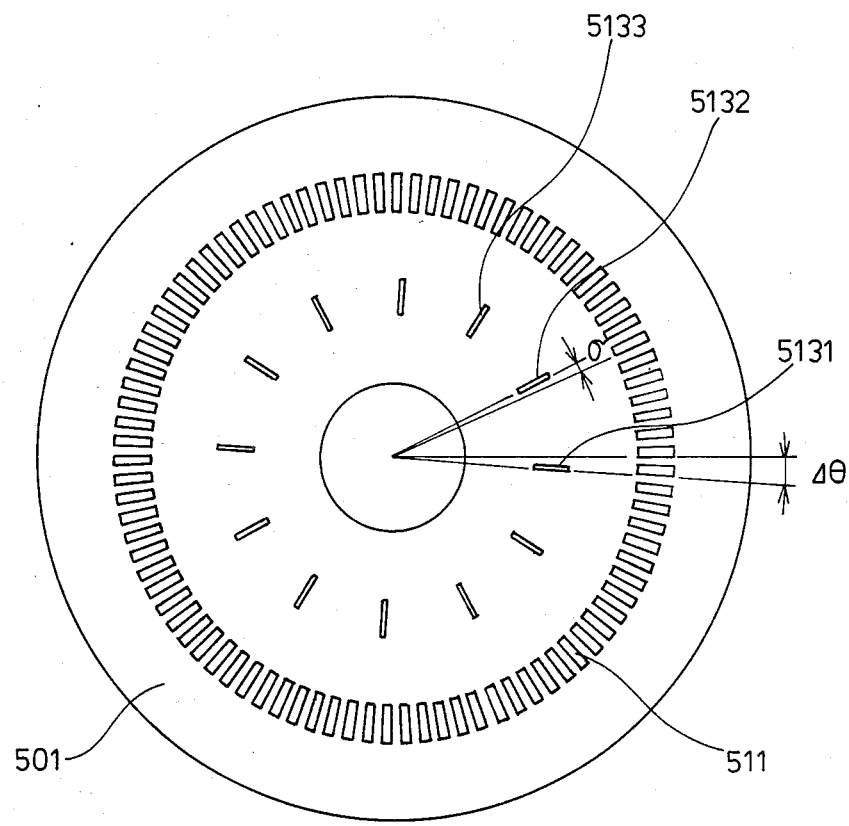
FIG. 16 is a plan view depicting details of the code disk 510 of FIG. 15.

FIG. 16 is a plan view depicting details of code plate 501 in FIG. 15. To angle detecting slit 511, a plurality of reference position detecting slits 5131,5132,5133 are arranged accompanying the respective different phase shifts in the direction of the displacement. The slit 5131, for example, is in phase with the angle detecting slit 5111, but the slit 5132 is out of phase by an angle δ with the same. Thes slit 5133 is angle shifted by 2δ, and an amount of the phase shift gradually becomes larger in the same way for the subsequent slits.

Descriptions of the reference position detecting operation are provided as follows. Code disk 501 is rotated in a constant direction when the power of the apparatus, such as a robot, is turned ON. Then, the code disk is stopped by the output signal generated from the reference signal generating circuit 11 when one of the reference position detecting slots 513 coincides with the position of slit 530 indicating a reference position. Then, the phase of the angle detecting slit is measured. The amount of the phase shift is 0 when code disk 501 is stopped by detecting the reference position detecting slit 5131. However, the amount of phase shift of $(\delta/\Delta\theta)\times 360°$ (wherein δθ is an angle corresponding to the previously described pitch P) is detected due to a shift angle δ when reference position detecting slit 5132 is detected. Since the amount of the phase shift always differs depending on the position of the reference position slot, the reference position (position from zero point) can be specified by a minimum return operation. It is possible to provide a reference position detecting slit having a resolution power of 1000 or more since a resolution power of the interposition is several 1000s according to experimental results. However, it is sufficient if a 50 through 100 slit is available because return operation for 5° through 10° will cause little trouble.

The detection of a reference position required for the reference position return operation can be performed with high accuracy by the zero point signal generator, disclosed, for example, in Japanese Utility Model No. 58-73341.

According to the above displacement transducer, an accident, wherein a robot arm bites the surrounding parts, can be prevented and loss of time reduced, because return to the reference position, is enabled with very little angular rotation. Consequently, the normal operation is established immediately after power is supplied.

In addition, when compared to the use of an absolute value type encoder for excluding zero point return operation, a device having high resolution power may be obtained at a low price.

In the above described embodiments, although an amount of phase shift of the reference postioin detecting slits is made gradually large, it is not limited to the above, but any other random phase shifting will do, unless the same of phase shift is applied.

Although each embodiment is described assuming use of a rotary encoder, a linear displacement encoder can also be used. Moreover, although four light receiving element groups are used, less than three light receiving elements per group may be used. Also, two light receiving element groups will provide the same measurement as the four light receiving element groups, provided that a device is so formed that the output signals from the two groups are phase shifted by 90° with each other and each of the output signals is inverted with respect to an average value to obtain output signals equivalent to the two remaining signals. Furthermore, for easy manufacture, a device arrangement wherein the phase plate is disposed over the multi-split image sensor photodiodes may be used, wherein of photodiodes with the same split and shape of a phase plate, are used instead of using the phase plate. Also, it is possible to produce a displacement transducer having high resolution and fast response with comparatively simple structure. Moreover, advantageously, the transducer is free from adverse influence of light source intensity change, sensitivity changes in elements comprising an image sensor, etc.

A further advantage of the invention is to minimize nonlinear errors in the transducer. Also, zero point return operation is suppressed to a minimum.

The foregoing description is illustrative of the principles of the invention. Numerous modifications and extensions thereof would be apparent to the worker skilled in the art. All such modifications and extensions are to be considered to be within the sprit and scope of the invention.

What is claimed is:

1. A displacement transducer comprising
a code disk comprising a plurality of light permeable slits formed therein and arranged with a first fixed pitch in the direction of displacement;
a light source for emitting parallel light beams which pass through said light permeable slits of said code disk;
an image sensor comprising a plurality of or a plurality of sets of light receiving elements, said plurality or plurality of sets being arranged with a second fixed pitch in the direction of displacement, said second pitch being larger than said first pitch, and switching means for successively extracting signals from each of said receiving elements in order of direction of displacement;
a band pass filter for extracting a fundamental wave component from the signals obtained from said receiving elements and switched by said switching means;
control means for driving said switching means with timing signals related to the fundamental wave frequency; and
phase measuring means for receiving output signals from said band pass filter and under the control of said control means for processing the output signals to measure the phase shift of the fundamental wave component at the zero point of the wave and producing signals indicative of the displacement of the code disk in proportion to the said phase shift.

2. The transducer of claim 1, wherein said phase measuring means comprises a phase locked loop including a frequency divider in a feedback circuit and an up-down counter to which a signal given from said phase locked loop and drive signal applied by said control means to said switching means are applied through a simultaneous pulse inhibit circuit.

3. The transducer of claim 2, wherein said image sensor comprises a phase plate having a plurality of slit holes, each positioned over a respective light receiving element.

4. The transducer of claim 3, wherein said plurality of slit holes are arranged in a plurality of groups, each group being positioned over a corresponding one of said light receiving elements and wherein said elements comprise photodiodes.

5. A displacement transducer comprising
a code disk having a plurality of light permeable slits formed therein and arranged with a first fixed pitch in the direction of displacement;
a light source for projecting parallel light onto said light permeable slits of said code disk;
an image sensor comprising n-separated light receiving elements arranged with a second fixed pitch in the direction of displacement, a phase plate having a plurality of groups of slit holes, each group comprising m slit holes, wherein m is an odd integer greater than 1 add n is an integer, said groups being arranged with a third fixed pitch in the direction of displacement, said slit holes of each group being positioned over a corresponding one of said light receiving elements, and switching means for successively switching signals from each of said light receiving elements in order of direction of displacement;
a band pass filter for extracting a fundamental wave component from the signals produced by said light receiving elements and switched by said switching means;
control means for driving said switching means with timing signals related to the fundamental wave frequency; and
phased measuring means for receiving output signals from said band pass filter and under the control of said control means for processing the output signals from said band pass filter to measure the phase shift of the fundamental wave component at the zero point of the wave and producing signals indicative of the displacement of the code disk in proportion to the said phase shift;
wherein said third fixed pitch has a 1/(m·n) multiple shift with respect to said first pitch.

6. A displacement transducer comprising
a code disk having a plurality of light permeable slits formed therein and arranged with a first pitch P in the direction of displacement;
a light source for projecting parallel light onto said light permeable slits of said code disk;
an image sensor comprising multi-separated light receiving elements arranged with a second fixed pitch in the direction of displacement for receiving light from said code disk and producing an output signal in response thereto, a phase plate having a plurality of slit holes each positioned over a respective light receiving element and arranged in the direction of displacement, and switching means for successively switching signals from each of said light receiving elements in order of direction of displacement;

a band pass filter for extracting a fundamental wave component from the signals produced by said light receiving elements and switched by said switching means;

control means for driving said switching means with timing signals related to the fundamental wave frequency; and phase measuring means for receiving output signals from said band pass filter and under the control of said control means for processing the output signals to measure the phase shift of the fundamental wave component at the zero point of the wave and producing signals indicative of the displacement of the code disk in proportion to the said phase shift;

wherein said plurality of slit holes are grouped into pairs, each pair having a pitch corresponding to an integral multiple of said first pitch P with a shift of $P/(4n+2)$, wherein n is a positive integer, and wherein each pair of slit holes is positioned opposite to a corresponding one of said light receiving elements, whereby $(2n+1)$th space harmonic waves contained in the output signal from each light receiving element are eliminated.

7. The transducer of claim 6, wherein each pair of slit holes has a pitch corresponding to an integral multiple of said first pitch P with a shift of P/6, whereby the 3rd space harmonic waves contained in the output signals from said light receiving signals are elminated.

8. A displacement transducer comprising a code disk comprising a plurality of light permeable slits formed therein and arranged with a first pitch P in the direction of displacement;

a light source for projecting parallel light onto said permeable slits of said code disk;

an image sensor comprising multi-separated light receiving elements arranged with a second fixed pitch in the direction of displacement for receiving light from said code disk and producing output signals in response thereto, a phase plate having a plurality of slit holes, each positioned over a respective light receiving element and arranged in the direction of displacement, and switching means for successively switching a signal from each of said light receiving elements in order of the direction of displacement;

a band pass filter for extracting a fundamental wave component from the signals produced by said light receiving elements and switched by said switching means;

control means for driving said switching means with timing signals related to the fundamental wave frequency; and phase measuring means for receiving output signals from said band pass filter and under the control means for processing the output signals to measure the phase shift of the fundamental wave component at the zero point of the wave and producing signals indicative of the displacement of the code disk in proportion to the said phase shift;

wherein said phase plate has $2^n$ slit holes arranged in pairs to form $2^{n-1}$ pairs of slit holes having a pitch corresponding to an integral multiple of said first pitch P with a shift of P/6 ... $P/(4n+2)$, for succeeding pairs in the direction of displacement, wherein n is a positive integer;

whereby the 3rd and higher $(2n+1)$th space harmonic waves contained in the output signals from said light receiving elements are eliminated.

9. A displacement transducer comprising a code disk having a plurality of light permeable slits formed therein and arranged with a first pitch P in the direction of displacement;

a light source for projecting parallel light onto said light permeable slits of said code disk;

an image sensor comprising multi-separated light receiving elements arranged with a second fixed pitch in the direction of displacement for receiving light from said code disk and producing output signals in response thereto, a phase plate having a plurality of slit holes, each positioned over a respective light receiving element and arranged in the direction of displacement, and switching means for successively taking out a signal from each of said light receiving elements in order of the direction of displacement;

a band pass filter for extracting a fundamental wave component from the signals produced by said elements and switched by said switching means;

control means for driving said switching means with timing signals related to the fundamental wave frequency; and phase measuring means for receiving output signals from said band pass filter and under the control of said control means for porcessing the output signals to measure the phase shift of the fundamental wave component at the zero point of the wave and producing signals indicative of the displacement of the code disk in proportion to the said phase shift;

wherein the width of each slit hole of said phase plate is P/3, whereby the 3rd space harmonic waves contained in the output signals from each of said light receiving element are eliminated.

10. A displacement transducer comprising a code disk having a plurality of light permeable slits formed therein and arranged with a first pitch P in the direction of displacement;

a light source for projecting parallel light onto said light permeable slits of said code disk;

an image sensor comprising multi-separate light receiving elements arranged with a second fixed pitch in the direction of displacement for receiving light from said code disk and producing output signals in response thereto, a phase plate having a plurality of slit holes, each positioned over a respective light receiving element and arranged in the direction of displacement, and switching eans for successively switching a signal from each of said light receiving element in order of direction of displacement;

a band pass filter for extracting a fundamental wave component from the signals produced by said light receiving elements and switched by said switching means;

control means for driving said switching means with timing signals related to the fundamental wave frequency; and phase measuring means for receiving output signals from said band pass filter and under the control of said control means for processing the output signals to measure the phase shift of the fundamental wave component at the zero point of the wave and producing signals indicative of the displacement of the code disk in proportion to the said phase shift;
wherein the width of each light permeable slit of said code disk is P/3, whereby the 3rd space harmonic waves contained in the output signals from each of said light receiving element are eliminated.

11. A displacement transducer comprising
a phase plate having slits arranged with a first fixed pitch in the direction of displacement and a slit indicative of a reference position;
a code disk displaceable relatively with respect to said phase plate and comprising a plurality of angle detecting slits arranged with a second fixed pitch in the direction of displacement and another plurality of reference position detecting slits arranged in the direction of displacement with respective different phase shifts with respect to said angle detecting slits;
a light source for projecting parallel light onto said slits of said code disk;
first multi-separated light receiving elements arranged in the direction of displacement for receiving light passed through said angle detecting slits of said code disk and said slits arranged with said first pitch of said phase plate and producing first output signals in response thereto;
a second light receiving element for receiving light passed through said reference position detecting slits of said code disk and said slit indicative of the reference position of said phase plate and producing second output signals in response thereto;
switching means for successively switching said first output signals from each of said first light receiving elements in order of the direction of displacement;
a band pass filter for extracting a fundamental wave component from the first output signals from said first light receiving elements and switched by said switching means;
control means for driving said switching means with timing signals related to the fundamental wave frequency;
phase measuring means for receiving output signals from said band pass filter and under the control of said control means for processing the output signals to measure the phase shift of the fundamental wave component at the zero point of the wave and producing signals indicative of the displacement of the code disk in proportion to the said phase shift;
and a reference position signal generating circuit for receiving said second output signals from said second light receiving element and for generating a signal indicative of the reference position.

* * * * *